US012770354B2

(12) United States Patent
Garcia

(10) Patent No.: US 12,770,354 B2
(45) Date of Patent: Oct. 20, 2026

(54) METHOD FOR ALIGNING AT LEAST TWO IMAGES FORMED BY THREE-DIMENSIONAL POINTS

(71) Applicant: Continental Autonomous Mobility Germany GmbH, Ingolstadt (DE)

(72) Inventor: Lucien Garcia, Toulouse (FR)

(73) Assignee: CONTINENT AUTONOMOUS MOBILITY GERMANY GMBH, Ingolstadt (DE)

( * ) Notice: Subject to any disclaimer, the term of this patent is extended or adjusted under 35 U.S.C. 154(b) by 682 days.

(21) Appl. No.: 18/015,196

(22) PCT Filed: Jul. 30, 2021

(86) PCT No.: PCT/EP2021/071461
§ 371 (c)(1),
(2) Date: Jan. 9, 2023

(87) PCT Pub. No.: WO2022/033902
PCT Pub. Date: Feb. 17, 2022

(65) Prior Publication Data

US 2023/0252751 A1 Aug. 10, 2023

(30) Foreign Application Priority Data

Aug. 10, 2020 (FR) ....................................... 2008407

(51) Int. Cl.
*G06T 7/70* (2017.01)
*G01S 17/894* (2020.01)
(Continued)

(52) U.S. Cl.
CPC .......... *G06V 10/245* (2022.01); *G01S 17/894* (2020.01); *G06T 7/70* (2017.01); *G06V 10/25* (2022.01); *G06V 10/761* (2022.01)

(58) Field of Classification Search
CPC .... G06V 10/245; G06V 10/25; G06V 10/761; G01S 17/894; G06T 7/70; G06T 7/246;
(Continued)

(56) References Cited

U.S. PATENT DOCUMENTS 6,516,099 B1 * 2/2003 Davison .................... G06T 7/33
348/42
10,867,190 B1 * 12/2020 Vajna .................. G06V 10/776
(Continued)

FOREIGN PATENT DOCUMENTS

CA 3098630 A1 * 11/2019 ............ G06T 19/20

OTHER PUBLICATIONS

"Cherverikov D et al., Automatic Alignment of Large 3D Data Sets for Facade Reconstruction from Car Mounted LIDAR Measurements, Dec. 5, 2013, IEEE, 4th edition, p. 301-305" (Year: 2013).*
(Continued)

*Primary Examiner* — Andrew W Bee
*Assistant Examiner* — D J Dhooge
(74) *Attorney, Agent, or Firm* — Buchanan Ingersoll & Rooney PC

(57) ABSTRACT

A method for aligning at least a first source image with a second reference image, each image including a set of three-dimensional points. The method being intended to reconstruct a common image by aligning the first source image with the second reference image. The method including at least: an association step of associating, in pairs, at least some of the points of the first source image, forming a first group of interest of points, with the corresponding points of the second reference image, using nearest neighbor criteria, a step of aligning the points associated in pairs by applying a spatial transformation. The method being noteworthy in that it includes a step of estimating the visibility of the points in order to limit point alignment errors.

10 Claims, 4 Drawing Sheets

(51) Int. Cl.
*G06V 10/24* (2022.01)
*G06V 10/25* (2022.01)
*G06V 10/74* (2022.01)

(58) Field of Classification Search
CPC ....... G06T 2200/04; G06T 2207/10028; G06T 2207/30252; G06T 7/33
See application file for complete search history.

(56) References Cited

U.S. PATENT DOCUMENTS

| | | | | |
|---|---|---|---|---|
| 2017/0206222 | A1* | 7/2017 | Kaminka | G06F 16/29 |
| 2021/0294328 | A1* | 9/2021 | Dhayalkar | G06T 7/73 |
| 2022/0122316 | A1* | 4/2022 | Huffman | G06T 7/579 |

OTHER PUBLICATIONS

"Chen, J., & Cho, Y. K. (Jun. 2018). Point-to-point comparison method for automated scan-vs-bim deviation detection. In Proceedings of the 2018 17th International Conference on Computing in Civil and Building Engineering, Tampere, Finland (pp. 5-7)." (Year: 2018).*

"T Ogawa et al, Lane Recognition Using On-vehicle LIDAR, Jun. 2006, Vehicle Integrated Systems R & D dept. Denso Corporation, vol. 1, pp. 540-545" (Year: 2006).*

Chetverikov et al., "Automatic Alignment of Large 3D Data Sets for Facade Reconstruction from Car-Mounted LIDAR Measurements", 2013 4th IEEE International Conference on Cognitive Infocommunications (COGINFOCOM), Dec. 2-5, 2013, pp. 301-306.

Izadinia et al., "Scene Recomposition by Learning-Based ICP", 2020 IEEE/CVF Conference on Computer Vision and Pattern Recognition (CVPR), Jun. 13, 2020, pp. 927-936.

Wong et al., "SegICP-DSR: Dense Semantic Scene Reconstruction and Registration", Cornell University Library 201 Onlin Library Cornell University, Nov. 11, 2017, 7 pages.

Olufs et al., "Towards Efficient Semantic Real Time Mapping of Man-Made Environments Using Microsoft's Kinect", 2011 IEEE International Conference on Robotics and Biomimetics, Dec. 7, 2011, pp. 130-137.

International Search Report and Written Opinion for International Application No. PCTEP2021/071461, dated Nov. 12, 2021, 9 pages.

International Search Report and Written Opinion for International Application No. PCT/EP2021/071461, dated Nov. 12, 2021, 14 pages (French).

French Search Report for French Application No. 2008407, dated Apr. 14, 2021 with translation, 13 pages.

* cited by examiner

METHOD FOR ALIGNING AT LEAST TWO IMAGES FORMED BY THREE-DIMENSIONAL POINTS

CROSS REFERENCE TO RELATED APPLICATIONS

This application is the U.S. National Phase Application of PCT International Application No. PCT/EP2021/071461, filed Jul. 30, 2021, which claims priority to French Patent Application No. 2008407, filed Aug. 10, 2020, the contents of such applications being incorporated by reference herein.

FIELD OF THE INVENTION

The present patent application relates to a method for aligning at least a first source image with a second reference image, each image comprising a set of three-dimensional points. This method is applicable in particular to a motor vehicle comprising a lidar on-board image acquisition device and a computer implementing such a method, in order to reconstruct the environment of the vehicle in three dimensions, for example.

BACKGROUND OF THE INVENTION

It is known to equip a motor vehicle with a driving assistance system, commonly called ADAS ("Advanced Driver Assistance System").

Such an assistance system comprises, as is known, a laser image acquisition device such as a Lidar (acronym for "Light Detection And Ranging"), for example mounted on the vehicle, which makes it possible to generate a series of images depicting the environment of the vehicle.

These images are then utilized by a computer for the purpose of assisting the driver, for example by detecting an obstacle (pedestrians, stationary vehicle, objects on the road, etc.) or else by estimating the time before a collision with the obstacles.

The information given by the images acquired by the lidar makes it possible to implement simultaneous localization and mapping (known by the acronym SLAM) in order to make it possible to simultaneously construct or enrich the scene depicting the environment of the motor vehicle and also to make it possible to locate the motor vehicle in the scene.

Therefore, the data provided by the images acquired by the lidar have to be reliable and relevant enough to allow the system to assist the driver of the vehicle.

Lidar is an active optical sensor that emits a laser beam along a sighting optical axis in the direction of a target.

The reflection of the laser beam from the surface of the target is detected by a receiving surface arranged in the lidar.

This receiving surface records the time that elapses between the time when the laser pulse is emitted and the time when it is received by the sensor in order to calculate the distance between the sensor and the target.

The distance measurements collected by the lidar, associated with positioning information, are transformed into measurements of real three-dimensional points of the target, each image acquired by the lidar forms a set of three-dimensional points, or point cloud, the points being considered to be a sample of a surface.

A three-dimensional point is understood to mean a point that is associated with coordinates in space, in a given three-dimensional reference system.

To depict the environment of the vehicle in three dimensions, it is known to align two images acquired by the lidar at two successive times, such that the images correspond to one other. The two images for depicting the environment may also originate from two different sensors, for example one sensor arranged on a right-hand part of the vehicle and one sensor arranged on an opposite, left-hand part of the vehicle, the fields of view of the two sensors having to overlap partially.

For this purpose, the prior art discloses a method for aligning at least a first source image with a second reference image, the images comprising a first set of three-dimensional points and a second set of three-dimensional points, respectively, the first set of three-dimensional points being associated with a reference system and with an optical axis, the first source image being acquired by way of at least one acquisition device, and the method being intended to reconstruct a common image by aligning the first source image with the second reference image, the method comprising at least:

- an association step of associating, in pairs, at least some of the points of the first source image, forming a first group of interest of points, with the corresponding points of the second reference image, using nearest neighbor criteria,
- a step of determining a spatial transformation to be applied to the points of the first source image to be aligned with the associated points of the second reference image, and
- a step of aligning the points associated in pairs during the previous association step, using said spatial transformation determined in the previous determination step.

This type of alignment method is known by the acronym ICP (for Iterative Closest Points).

One problem observed with such an alignment method is the risk of incorrect association of the points of the first source image with the points of the second reference image during the association step.

Indeed, the points are associated with one another using nearest neighbor criteria, that is to say, for a point in question of the first source image, a calculation is carried out to determine the nearest point that will be associated therewith. However, it may be the case that a point is considered to be near in an irrelevant manner, for example when the point considered to be near is not visible or is barely visible, because it is hidden by a foreground for example.

Another problem that is observed is the slow execution time of a method for aligning two images that each comprise a set of three-dimensional points.

SUMMARY OF THE INVENTION

An aspect of the present invention aims in particular to solve these drawbacks.

This aim is achieved, along with others that will become apparent upon reading the following description, with a method for aligning at least a first source image with a second reference image, the images comprising a first set of three-dimensional points and a second set of three-dimensional points, respectively, the first set of three-dimensional points being associated with a reference system is (x,y,z) and with an optical axis, the first source image being acquired by way of at least one acquisition device, and the method being intended to reconstruct a common image by aligning the first source image with the second reference image, the method comprising at least:

- an association step of associating, in pairs, at least some of the points of the first source image, forming a first group of interest of points, with the corresponding points of the second reference image, using nearest neighbor criteria,
- a step of determining a spatial transformation to be applied to the points of the first source image to be aligned with the associated points of the second reference image, and
- a step of aligning the points associated in pairs during the previous association step, by applying said spatial transformation determined in the previous determination step, this method being noteworthy in that it comprises a step of estimating the visibility of the points, which estimates a visibility value at least some of the points of the first source image and/or of the second reference image, in order to limit point alignment errors.

According to other optional features of the method according to an aspect of the invention, taken individually or in combination:

- the method comprises a selection step, before the step of associating the points, which aims to select the points estimated to be visible during the visibility estimation step, in order to form said first group of interest of points intended to be associated during the association step; this selection makes it possible to improve the execution speed of the method by limiting the number of pairs of points to be processed by the following steps of the method; this selection also makes it possible to minimize the errors of incorrect associations of points during the association step;
- the method comprises a weighting step that assigns a weight to each point for which a visibility value was estimated during the visibility estimation step, said assigned weight being proportional to the estimated visibility value, the weighting of the points aiming to refine the alignment of the points during the alignment step;
- during the step of estimating the visibility of the points, the visibility value Vp for each point p in question is estimated through the following calculation:

$$Vp=(dpMax-dp)/(dpMax-dpMin) \quad \text{[Math 1]}$$

- considering the first set of points of the first source image and the associated optical axis such that an image set of points corresponds to the set of points that have an image projection along the optical axis in a two-dimensional image reference system i'(x,y), and
- a selection of points comprising a point that exhibits a maximum distance dpMax, a point that exhibits a minimum distance dpMin, and the point involved in the visibility estimation that exhibits a distance dp; the estimation of the visibility has the advantage of being based on a simple calculation that has little or no effect on the execution time of the method according to an aspect of the invention;
  - said selection comprises the k nearest neighbors of each point involved in the visibility estimation, the k nearest neighbors belonging to the image set;
  - said selection is a selection of the points belonging to a region of interest in relation to each point involved in the visibility estimation;
  - the at least one acquisition device is a lidar laser-based remote sensing device that is configured to generate a set of three-dimensional points;
- the method comprises an odometry step that is designed to estimate the position of the vehicle by integrating the spatial transformations that are carried out in order to align the first source image with the second reference image during the method, the spatial transformations reflecting the displacements of the vehicle.

An aspect of the present invention also relates to a computer for a motor vehicle, configured to implement the alignment method in accordance with the above.

An aspect of the present invention also relates to a motor vehicle comprising a computer and at least one acquisition device, in accordance with the above.

BRIEF DESCRIPTION OF THE DRAWINGS

Other features and advantages of aspects of the invention will become apparent on reading the following description, with reference to the appended figures, in which.

For greater clarity, identical or similar elements are denoted by identical or similar reference signs throughout the figures.

DETAILED DESCRIPTION OF THE PREFERRED EMBODIMENTS

Figure 1:
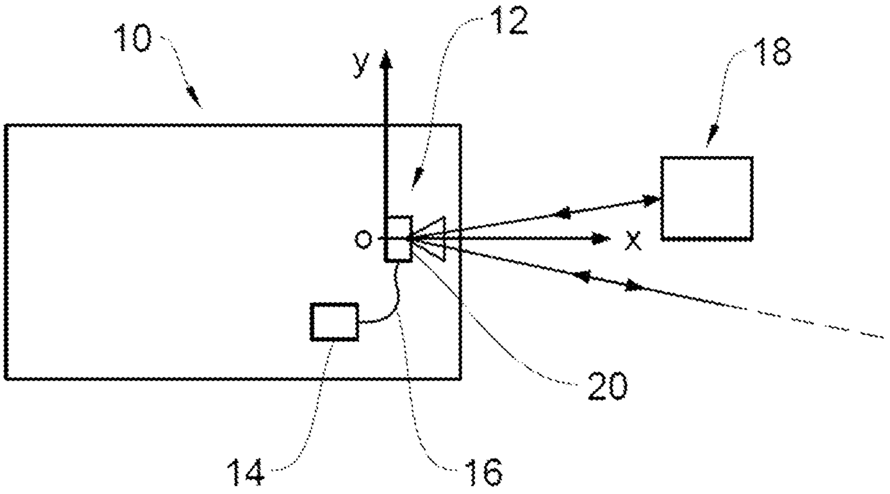
FIG. 1 illustrates a schematic view of a motor vehicle comprising an acquisition device and a computer programmed to implement the alignment method according to an aspect of the invention.

FIG. 1 shows a motor vehicle 10 equipped with an acquisition device 12 and a computer 14, which belong to a driving assistance system. The acquisition device 12 and the computer 14 communicate with one another via a wired link 16. However, without limitation, the acquisition device 12 and the computer 14 may communicate with one another via a wireless link.

The acquisition device 12 comprises a lidar (acronym for "Light Detection And Ranging"), which makes it possible to generate a set of three-dimensional points, or point cloud. However, without limitation, the acquisition device 12 may be any type of device able to capture three-dimensional images, such as a radar or a stereoscopic camera.

Figure 2:
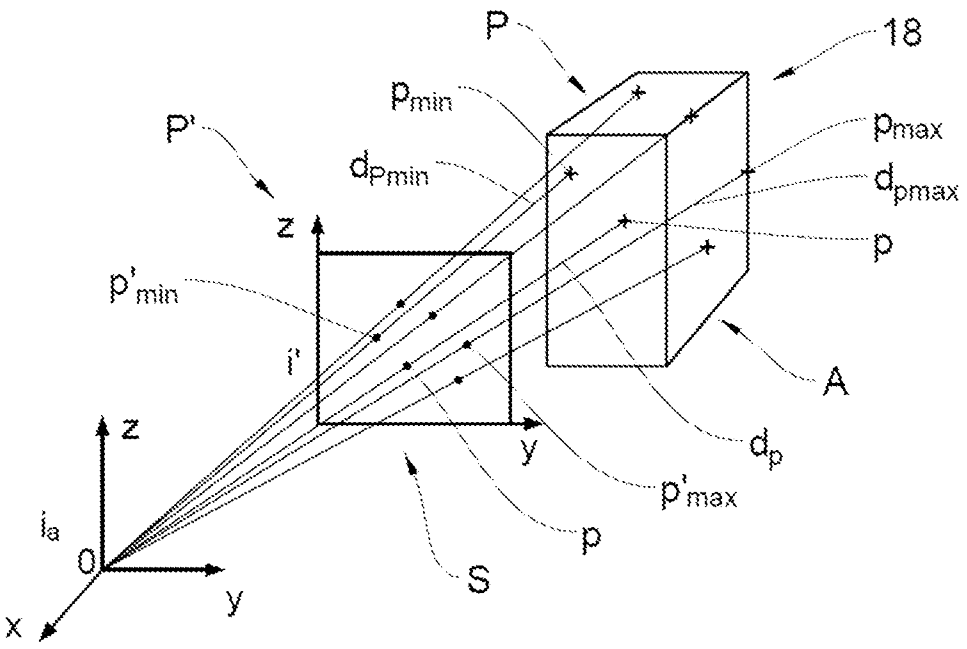
FIG. 2 illustrates a schematic view of the first source image comprising a set of three-dimensional points and a selection of neighboring points corresponding to the nearest neighbors of one of the three-dimensional points, neighboring points which have an image projection in a two-dimensional image reference system plane.

The acquisition device 12 emits a laser beam, here along an optical axis Ox with reference to FIGS. 1 and 2. The reflection of the laser beam from the surface of a target 18 is detected by a receiving surface 20 arranged in the acquisition device 12.

The acquisition device 12 records the time that elapses between the time when the laser pulse is emitted and the time when it is received by the receiving surface 20, in order to calculate in particular the distance away from the detected points of the target 18.

The method according to an aspect of the invention makes it possible to reconstruct a common image B' that depicts a scene, by aligning a first source image A with a second reference image B.

The first source image A is acquired by the acquisition device 12 at a time t. The first source image A comprises a first set P of three-dimensional points belonging to a reference system is (x,y,z), as may be seen in FIGS. 2 and 3.

The second reference image B is formed by the aggregation of a plurality of source images acquired prior to the first source image A. The second reference image B comprises a second set M of three-dimensional points belonging to a reference system ib (x,y,z).

The second image B depicts, at least partially, the environment of the vehicle 10. It will be noted that the first source image A and the second reference image B are similar, that is to say that they depict the same environment observed at two close times.

Figure 4:
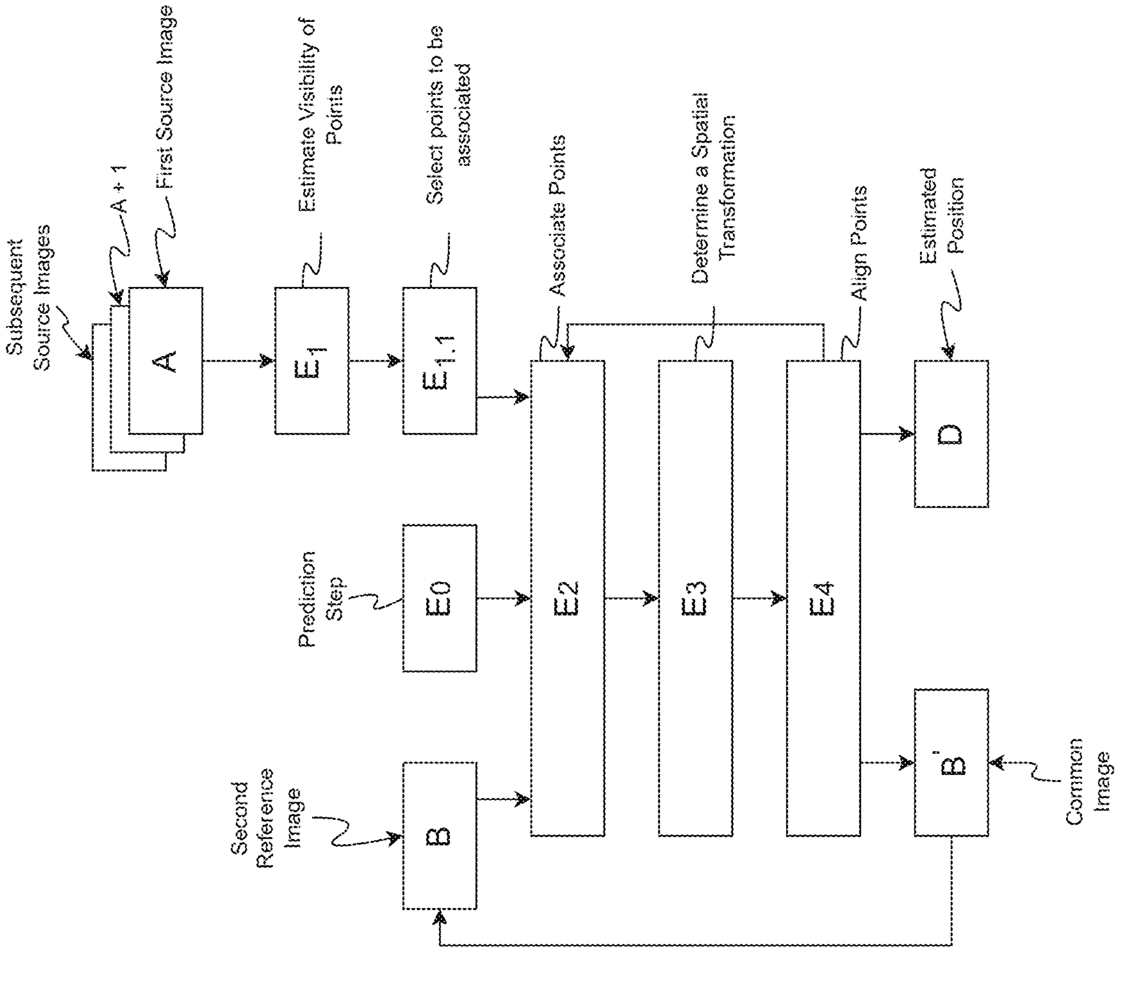
FIG. 4 illustrates a flowchart of a first embodiment of the method according to an aspect of the invention.

According to a first embodiment of the method according to the invention, with reference to FIG. 4, the method successively comprises a step E1 of estimating the visibility of the points, a step E1.1 of selecting the points to be associated, a step E2 of associating the points, a step E3 of determining a spatial transformation and a step E4 of aligning the points.

The visibility estimation step E1 estimates a visibility value Vp at all of the points of the first source image A. However, without limitation, it is possible to apply the visibility estimation step E1 to only some of the points of the first source image A.

A point is considered to be visible when it is visible to a user seated in the vehicle 10 equipped with the acquisition device 12, or to a camera on board the vehicle 10.

Indeed, the lidar as acquisition device 12 is capable of detecting points that are not visible because they are masked by a foreground, for example.

During the step E1 of estimating the visibility of the points, the visibility value Vp for a point p of the first source image A is estimated through the following calculation, with reference to FIG. 2:

$$Vp=(dpMax-dp)/(dpMax-dpMin) \qquad \text{[Math 1]}$$

considering the set P of points p of the first source image A and an associated optical axis Ox such that an image set P' of points corresponds to the set of points that have an image projection along the optical axis Ox in a two-dimensional image reference system i'(x,y). The image reference system plane i'(x,y) corresponds for example to the receiving surface 20 of the acquisition device 12, and its unit is in pixels, and a selection S of points corresponds to the k nearest neighbors of a point p belonging to the image set P', the selection S comprising a point pMax that exhibits the maximum distance dpMax of the selection S, a point pMin that exhibits the minimum distance dpMin of the selection S, and the point p involved in the visibility estimation that exhibits a distance dp.

Each distance dpMax, dpMin, dp represents the distance between the detected point and its associated reference system, recorded by the acquisition device 12.

According to one preferred exemplary embodiment, the selection S of points comprises the k nearest neighbors of each point involved in the visibility estimation, the k nearest neighbors belonging to the image set P'.

Without limitation, the selection S of points may group together points that form a region of interest in relation to each point p involved in the visibility estimation. The region of interest, which does not necessarily comprise the points nearest to the point p in question, may comprise noteworthy points arranged in the vicinity of the point p in question, for example points that delimit the edge of a target object.

In addition, the step E1 of estimating the visibility of the points may be applied for a point p of the second reference image B. Similarly, the step E1 of estimating the visibility of the points may be applied for points both of the first source image A and of the second reference image B.

The greater the calculated visibility value Vp, the greater the probability of the point p in question being visible.

The visibility estimation step E1 thus makes it possible to determine, as a function of the visibility value Vp assigned to each point, whether a point is considered to be visible or not visible, for example by comparing the estimated visibility value Vp with a predetermined threshold visibility value.

The calculation of the visibility value Vp for a point p during the visibility estimation step E1, described above, is given by way of example. Other types of calculation are conceivable. However, the calculation of the value Vp described above has the advantage of being simple and fast to execute, thus allowing real-time execution.

Still according to the first embodiment of the invention, the selection step E1.1 aims to select the points of the first source image A in order to form a first group of interest of points that will be associated subsequently. The group of interest comprises the points estimated to be visible during the previous visibility estimation step E1.

Without limitation, the points forming the group of interest may be selected from among the points of the second reference image B, and not from among the points of the first source image A, during the selection step E1.1.

The association step E2, which is executed following the selection step E1.1, consists in associating, in pairs, the points of the first group of interest, belonging to the first source image A, with the corresponding points of the second reference image B, using nearest neighbor criteria.

Figure 3:
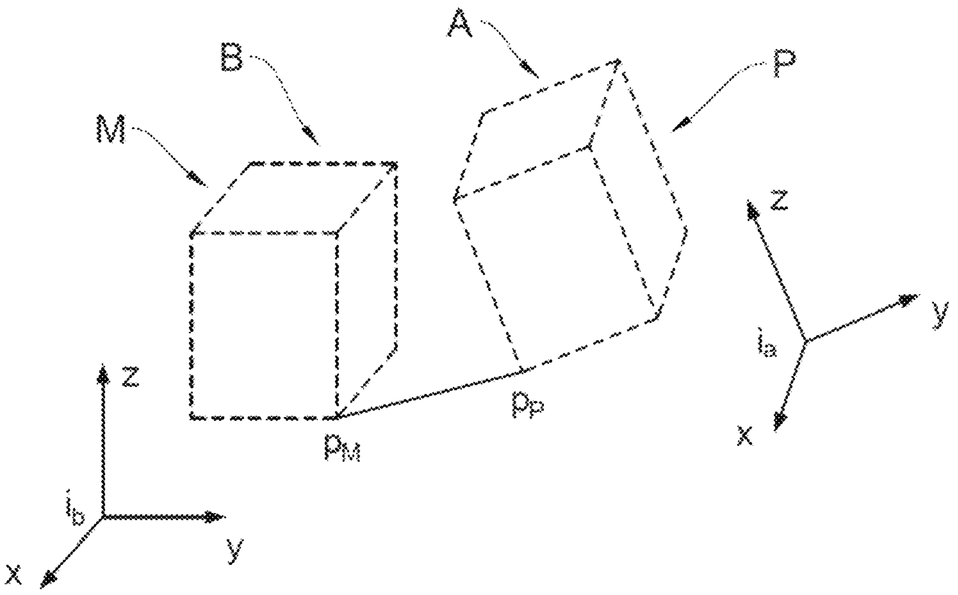
FIG. 3 illustrates a schematic view of a first source image and a second reference image, before alignment, which each comprise a set of three-dimensional points.

Nearest neighbor criteria make it possible, using calculations that are known from the prior art, to determine, for a point in question of the first source image A, the nearest neighboring point belonging to the second reference image B, as illustrated in FIG. 3 with the association of the points pM and pP.

One advantage of an aspect of the invention is that of limiting the number of pairs of points to the points considered to be visible, thereby making it possible to limit incorrect associations of points and also to reduce the execution time of the alignment method, in particular the execution time of the association step E2.

The determination step E3, which is executed following the association step E2, makes it possible to determine the spatial transformation to be applied to each pair of points, that is to say to each point of the first source image A that is associated with a point of the second reference image B, such that the points of the first source image A align with the associated points of the second reference image B.

Spatial transformation is understood to mean a combination of translation and rotation that minimizes the sum of the distances between the points of each pair of points associated in the association step. The spatial transformation uses for example a mean squared error cost function.

Following the step E3 of determining the spatial transformation, the method comprises a step E4 of aligning the points of the first source image A with the associated points of the second reference image B.

The alignment step E4 consists in applying the spatial transformation determined during the previous determination step E3 to the points of the first source image A.

It will be noted that steps E2 to E4 of the method according to the first embodiment are repeated iteratively until the first source image A is aligned, or close to being aligned, with the second reference image B, or until the number of iterations reaches a predetermined threshold. The objective is to iteratively minimize the distance between the first source image A and the second reference image B. The number of iterations may also be predetermined, for example.

It will also be noted that, in each iteration, the first source image A is transformed, or displaced, so as to tend toward alignment with the second reference image B, the reference system is (x,y,z) associated with the first image A also being transformed identically.

According to one variant embodiment that is not shown, step E1 enters the iterative loop, such that the visibility of the points is calculated in each iteration. Steps E1 to E4 of the method according to the first embodiment are thus repeated iteratively until the first source image A is aligned with the second reference image B, or until the number of iterations reaches a predetermined threshold.

As may be seen in FIG. 4, the assembly of the first source image A with the second reference image B makes it possible to obtain the common image B', which forms a new reference image and which depicts the current environment of the motor vehicle 10.

The common image B' is used as reference image B in a following execution cycle of the method according to an aspect of the invention.

Indeed, the method according to an aspect of the invention is described above for a first source image A, that is to say for a first image acquired by the acquisition device 12 at a time t, corresponding to a first position of the vehicle 10. It will be noted that the method is repeated cyclically for each source image A+1 acquired at a time t+1, corresponding to a new position of the vehicle 10.

Without limitation, the method according to an aspect of the invention may also be applied to images taken by two different sensors.

With reference to FIG. 4, according to one variant embodiment, the method comprises a prediction step E0 that applies a spatial transformation to the first source image A by estimating the displacement of the vehicle 10 based on its previous displacements, proceeding from the principle that the vehicle has a certain inertia, hence a certain constancy in terms of movement.

Finally, the alignment method according to an aspect of the invention comprises an odometry step that estimates the position D of the vehicle 10 by integrating the spatial transformations that are carried out in order to align the first source image A with the second reference image B during the method, the spatial transformations reflecting the displacements of the vehicle 10.

Figure 5:
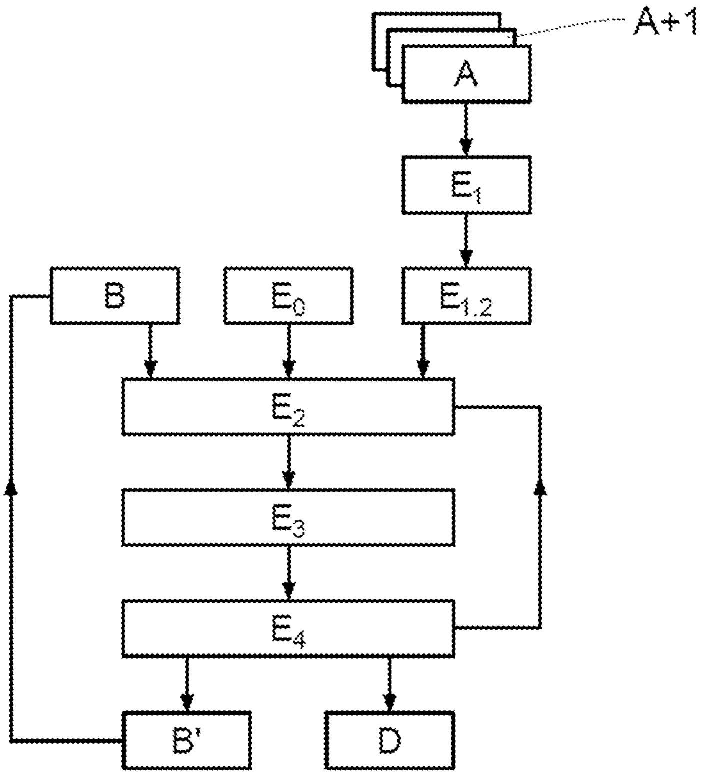
FIG. 5 illustrates a flowchart of a second embodiment of the method according to an aspect of the invention.

According to a second embodiment of the invention, with reference to FIG. 5, the method successively comprises a step E1 of estimating the visibility of the points, a weighting step E1.2, a step E2 of associating the points, a step E3 of determining a spatial transformation and a step E4 of aligning the points.

The method according to the second embodiment is similar to the method according to the first embodiment described above. It will be noted that, unlike the first embodiment of the method, the second embodiment comprises an additional weighting step E1.2, but no longer comprises the step E1.1 of selecting the points to be associated.

Therefore, in order not to unnecessarily overload the description, only the weighting step E1.2 is described in the remainder of the description.

The weighting step E1.2 assigns a weight to each pair of associated points. The weight assigned to each pair of points is proportional to the estimated visibility value Vp. The more a point is estimated to be visible, the higher its weight. According to one exemplary embodiment illustrated in FIG. 5, the weighting step E1.2 is carried out following the visibility estimation step E1.

Each pair of points has an influence on the determination of the spatial transformation calculated during the determination step E3. Thus, by taking into account the weight of the pairs of points in the calculation of the spatial transformation, weighting the pairs of points makes it possible to improve the accuracy of the alignment of the first source image A with the second reference image B, by minimizing the influence of the pairs of points estimated to be less visible.

According to another aspect of the invention, the method according to the invention implements simultaneous localization and mapping (known by the acronym SLAM) in order to make it possible to simultaneously construct or improve the second reference image B depicting the environment of the motor vehicle 10 and also to make it possible to locate the motor vehicle 10 in the second reference image B.

Of course, the invention is described in the above by way of example. It is understood that those skilled in the art are able to produce various variant embodiments of the invention without thereby departing from the scope of the invention.

The invention claimed is:

1. A method for aligning at least a first source image with a second reference image, the images comprising a first set of three-dimensional points and a second set of three-dimensional points, respectively, the first set of three-dimensional points being associated with a reference system ia and with an optical axis, the first source image being acquired by way of at least one acquisition device, and the method being intended to reconstruct a common image by aligning the first source image with the second reference image, the method comprising at least:

an association step of associating, in pairs, at least some of the points of the first source image, forming a first group of interest of points, with the corresponding points of the second reference image, using nearest neighbor criteria;

a step of determining a spatial transformation to be applied to the points of the first source image to be aligned with the associated points of the second reference image;

a step of aligning the points associated in pairs during the previous association step, by applying said spatial transformation determined in the previous determination step;

a step of reconstructing a common image based on aligning the first source image with the second reference image using the previous step of aligning the points associated in pairs, wherein reconstructing the common image forms a new reference image used in place of the second reference image in a subsequent iteration;

iteratively repeating the association step, determination step, alignment step, and reconstructing step using the new reference image as the second reference image; and a step of estimating the visibility of the points, which estimates a visibility value of at least some of the points of the first source image and at least some of the points of the new reference image, in order to limit point alignment errors.

2. The method as claimed in claim 1, further comprising a selection step, before the step of associating the points, which aims to select the points estimated to be visible during the visibility estimation step, in order to form said first group of interest of points intended to be associated during the association step.

3. The method as claimed in claim 1, further comprising a weighting step that assigns a weight to each point for which a visibility value was estimated during the visibility estimation step, said assigned weight being proportional to the estimated visibility value, the weighting of the points aiming to refine the alignment of the points during the alignment step.

4. The method as claimed in claim 1, wherein the at least one acquisition device is a lidar laser-based remote sensing device that is configured to generate a set of three-dimensional points.

5. The method as claimed in claim 1, further comprising an odometry step that is designed to estimate the position of the vehicle by integrating the spatial transformations that are carried out in order to align the first source image with the second reference image during the method, the spatial transformations reflecting the displacements of the vehicle.

6. A computer for a motor vehicle, configured to implement the alignment method as claimed in claim 1.

7. A motor vehicle comprising a computer as claimed in claim 6 and at least one lidar acquisition device.

8. A method for aligning at least a first source image with a second reference image, the images comprising a first set of three-dimensional points and a second set of three-dimensional points, respectively, the first set of three-dimensional points being associated with a reference system ia and with an optical axis, the first source image being acquired by way of at least one acquisition device, and the method being intended to reconstruct a common image by aligning the first source image with the second reference image, the method comprising at least:

an association step of associating, in pairs, at least some of the points of the first source image, forming a first group of interest of points, with the corresponding points of the second reference image, using nearest neighbor criteria;

a step of determining a spatial transformation to be applied to the points of the first source image to be aligned with the associated points of the second reference image;

a step of aligning the points associated in pairs during the previous association step, by applying said spatial transformation determined in the previous determination step;

iteratively repeating the association step, determination step and alignment step; and a step of estimating the visibility of the points, which estimates a visibility value of at least some of the points of the first source image or of the second reference image, in order to limit point alignment errors;

wherein, during the step of estimating the visibility of the points, the visibility value Vp for each point p in question is estimated through the following calculation:

$$Vp=(dpMax-dp)/(dpMax-dpMin) \quad \text{[Math 1]}$$

considering the first set of points of the first source image and the associated optical axis such that an image set of points corresponds to the set of points that have an image projection along the optical axis in a two-dimensional image reference system i', and a selection of points comprising a point that exhibits a maximum distance dpMax, a point that exhibits a minimum distance dpMin, and the point involved in the visibility estimation that exhibits a distance dp.

9. The method as claimed in claim 8, wherein said selection comprises the k nearest neighbors of each point involved in the visibility estimation, the k nearest neighbors belonging to the image set.

10. The method as claimed in claim 8, wherein said selection is a selection of the points belonging to a region of interest in relation to each point involved in the visibility estimation.

* * * * *